Patented Aug. 19, 1952

2,607,710

UNITED STATES PATENT OFFICE 2,607,710

ABRASION-RESISTANT MAGNETIC RECORDING TAPE

Ambrose F. Schmelzle and Esther E. Eastwold, St. Paul, Minn., assignors to Minnesota Mining & Manufacturing Company, St. Paul, Minn., a corporation of Delaware No Drawing. Application April 2, 1949, Serial No. 85,266

3 Claims. (Cl. 117—76)

This invention relates to surface-coated magnetic recording media, particularly in sheet or tape form, the surface coating being composed essentially of ferro-magnetic particles in a flexible binding medium comprising a blend of a high molecular weight vinyl polymer and a rubbery butadiene-acrylonitrile polymer.

In one popular method of recording signals on a medium such as magnetic recording tape, the tape is pulled by a constant-speed capstan past a stationary magnetic head which forms a part of a recording circuit, where it is subjected to a fluctuating magnetic field, the fluctuations being set up by the incoming signal. A magnetic record of the signals is thus impressed on the tape. When the tape is subsequently pulled past a similar magnetic head connected in a reproducing circuit, the original signal is regenerated in that circuit.

Except for the brief period during which it is pulled past the magnetic heads, the tape is kept in the form of a more or less tightly wound roll. One of the requirements of a recording medium, particularly in the home entertainment field, is that the recording be permanent over long periods of time. Hence the rolls of tape are required to be capable of remaining in storage for years without loss of playability. There must be no sticking together of the adjacent convolutions of the roll, nor any embrittlement of the binder such as might result in cracking or flaking of active material.

Loss of active material is disastrous, in the case of magnetic recording tape, for a number of reasons. The removal of relatively large sections of the active material by flaking causes complete loss of signal, either before or after recording. Greater or lesser amounts of the active material may be lost from an inferior tape product either by "dusting" from a poorly adherent binder or by "rub-off" of traces of a soft binder and associated active material, usually at the area of contact between tape and magnetic head. Loss of material in whatever form is indicative of wear, and under such conditions the useful life of the tape is decreased. A more serious effect is the building up of a deposit of the loosened material on the magnetic head, resulting in distortion of the signal and in lowered efficiency of recording and reproducing.

A further and obvious requirement of a satisfactory magnetic recording tape is that it have suitable magnetic properties. Magnetic iron oxide is commonly employed as the active material, and the powdered oxide is treated to secure certain desired values of coercive force, remanence, etc., before incorporation in the tape structure. It is necessary to retain these properties while still obtaining uniform distribution of the oxide particles, since uneven distribution contributes to such undesirable phenomena as high noise level.

Still further requirements of magnetic recording tape, particularly in the fields of high-fidelity reproduction and accurate timing operations, are concerned with the dimensional stability of the product. The problem is rendered more acute by the accompanying requirement of extreme thinness or low space factor.

The conventional binders employed, prior to the present invention, in making coated magnetic recording tapes were either inherently defective in one or more particulars, or contributed to deficiencies in other components of the product. Cellulosic derivatives such as cellulose nitrate, for example, are necessarily plasticized with materials such as dibutyl phthalate in order to prevent brittleness and flaking of the coating. Aging of such a plasticized coating results in loss of plasticizer by volatilization, and embrittlement of the remaining coating. Where these plasticized binders are applied to certain types of backings, the plasticizer is found, under certain test conditions, to slowly migrate into the backing, thus embrittling the coating and at the same time softening the backing and rendering it more easily stretchable. A further problem, where cellulose nitrate is employed, is the known tendency of the cellulose nitrate itself to deteriorate on prolonged storage, particularly at elevated temperatures.

A primary object of this invention is the provision of surface-coated magnetic recording media either in the form of cylinders, discs, sheets or the like or more particularly in the form of a thin, narrow, continuous tape which may be wound on reels and rewound for high-fidelity recording and reproducing of signals, and which avoids the above-noted as well as other deficiencies of the prior art. The desired product is non-blocking, i. e. may be unwound from roll form without sticking or jerking, and is dimensionally stable. The tape product has sufficient mechanical strength, toughness and flexibility to be used on conventional magnetic tape recorder equipment without breakage. The magnetic coating is firmly bonded, flexible, and of the correct hardness and toughness to remain as a smooth and continuous film under use conditions.

These and other objects and advantages are achieved in the novel constructions of the present invention, as exemplified by the following specific structures.

*Example 1*

In this example a low-stretch, dimensionally stable cellulose acetate film having a caliper of about 0.0015 inch, lengthwise tensile strength of 15–20 lbs. per inch width, and elongation at break of less than 12%, is used as the supporting backing.

The film is first prime-coated with about 0.5 grain per 24 sq. in. of a blend of 100 parts of rubbery butadiene-acrylonitrile polymer and 65 parts of compatible spirit-soluble heat-reactive phenol-aldehyde resin, applied from solution in methyl isobutyl ketone. The solid, resinous, partially reacted condensation product of one mole of phenol, 0.25 mol of acetaldehyde and 0.95 mol of formaldehyde is spirit-soluble, i. e. soluble in lower alcohols, esters and ketones and is suitable. An extremely thin coating of this material provides a strongly adherent bond between the acetate film base and the outer magnetic coating.

The magnetic coating consists of two parts by weight of a magnetic red iron oxide powder uniformly dispersed in, and bonded with, a high molecular weight vinyl resin polymer which has been plasticized and modified with a lesser proportion of a compatible rubbery butadiene-acrylonitrile polymer. The coating is applied with the aid of a volatile organic solvent which is then volatilized and removed, leaving approximately 6.5–7 grains of dry coating per 24 sq. in. The coating is finally given a smooth surface finish by passing the tape twice through a supercalender.

In this example, the vinyl polymer is a copolymer of 90 parts of vinyl chloride and 10 parts of vinyl acetate, and the rubbery polymer is a copolymer made of 65 parts of butadiene-1,3 and 35 parts of acrylonitrile. Four parts by weight of the vinyl polymer, together with a small amount of an organic lead stabilizer, and one part of the freshly milled rubbery polymer, are dissolved and blended in methyl isobutyl ketone. Brief milling of the rubbery polymer on a rubber mill just prior to dissolving is found to be advantageous in increasing the rate of solution and in reducing the final viscosity. To this preliminary binder solution, having a solids content of 20%, is then added the magnetic iron oxide and an additional quantity of methyl isobutyl ketone, to provide a composition having a solids content of 38%. This mixture is milled in a ball mill until the oxide is completely and uniformly dispersed as small uniform-sized particles when viewed under the microscope, and the mixture when coated and dried in a thin film feels perfectly smooth to the finger.

In a variation of this procedure, the polymers are separately dissolved in portions of the solvent, and the solutions are blended before or during dispersion of the magnetic powder in the ball mill. The solids content may vary from the amount indicated; in a typical preparation by the method just described, the solids content of the final dispersion was 33%.

The individual particles of the particular magnetic oxide employed in this example were of a blocky or chunky character as seen under a microscope.

Coated tape prepared with either of the above-described dispersions was found to have excellent magnetic and physical properties as demonstrated by actual use tests. The tape unwound from the reel without sticking, and did not cause build-up of magnetic material on the magnetic head. Equally good results were obtained after prolonged storage at 120° F. as were obtained with the freshly prepared tape. Additionally, the tape was tested successfully at low temperatures, under which conditions nitrocellulose-bonded tapes are known to suffer severe cracking and flaking.

Other solvents or solvent mixtures may be used. For example, the vinyl polymer may be dissolved in a mixture of methyl ethyl ketone and toluene, and the rubbery polymer dissolved in toluene; the two solutions are then blended and the magnetic powder added in the ball mill.

While not essential, small amounts of various additives may be incorporated in the tape in various ways for special purposes. The organic lead compounds or other stabilizers for the vinyl polymer are included within this category, as are other stabilizers, antioxidants or preservatives, wetting or dispersing agents, etc. Where toluene is employed as a component of the solvent mixture, it is found desirable to add dispersing agents such as "Aerosol OT" dioctyl ester of sodium sulfosuccinate, "Yelkin TTS" lecithin-oil mixture, etc., in order to speed up the dispersion of the pigment in the ball mill and prevent subsequent settling during storage in solution form.

*Example 2*

In this example the prime-coated cellulose acetate film of Example 1 was further coated with 7–8 grains per 24 sq. in. of a dispersion of two parts of an acicular magnetic iron oxide powder in one part of a 60:40 blend of the vinyl polymer and rubbery polymer identified in Example 1. The somewhat higher proportion of rubbery polymer was found to be required in order to provide adequate flexibility of the magnetic coating, where the acicular type of oxide particles was substituted for the chunky type. This tape product, like that of the previous example, did not crack or flake, did not lose active material by abrasion against the magnetic head, and did not cause sticking in the reel. Both of the tapes were dimensionally stable under the tension encountered in normal use of the product, even though their caliper was less than that of many prior art tape constructions.

*Example 3*

Thin rope-fiber tissue paper ("Flexrope") having an initial caliper of 0.00175 inch was supercalendered to a caliper of 0.0015 inch and was then saturated with a pigmented plasticized vinyl polymer. The impregnated sheet was coated directly with the suspension of magnetic oxide as described in Example 2, and the coated surface supercalendered until smooth.

The impregnating solution for the paper backing was made by mixing together 100 parts of 90:10 vinyl chloride: vinyl acetate copolymer, 11.1 parts of dioctyl phthalate, and 3 parts of a stabilizer (e. g., "V–1–N" stabilizer), forming the mixture into a homogeneous sheet on a rubber mill, adding 100 parts of $TiO_2$ pigment on the mill, and dispersing the milled stock in 812 parts of methyl isobutyl ketone. About 1½ grains dry weight per 24 sq. in. of tissue was required for saturation. This coating acts as a priming agent for providing a firm bond between the backing and the magnetic coating and also adds to the strength of the paper backing.

Although butadiene - acrylonitrile polymers have previously been combined with vinyl chloride-vinyl acetate polymers in various proportions, such combinations have never to our knowledge previously been suggested as binders for magnetic particles in coated magnetic recording tapes. Monomeric liquid plasticizers have generally been included in these prior art compositions, even where the application involved far lower flexibility requirements than are involved in the use of these tapes. Additionally in view of the high pigment volume loading required for desired magnetic properties, it would normally be supposed that considerable proportions of liquid type plasticizers would therefore be required with the polymeric binders in providing adequate flexibility in the magnetic coatings. Vinyl polymer binders containing liquid plasticizers would be subject to the same deficiencies as the plasticized nitrocellulose binders. Since in addition the vinyl polymers are in general more expensive than nitrocellulose, it is not surprising that no attempt was made, prior to our invention, to utilize these materials as binders for coated magnetic recording tapes.

Surprisingly, we have now found that combinations of vinyl polymers and butadiene-acrylonitrile polymers as herein described, and without the addition of monomeric or liquid type plasticizers, are fully adequate in flexibility for use as binders for the magnetic particles of coated magnetic recording tape. In addition, these novel binder compositions provide improved results in terms of permanence, heat-resistance, performance at low temperatures, and, even more significantly, in terms of abrasion resistance.

This last-named property we have found may be measured, in terms which correlate well with results obtained in actual long-time use on a magnetic recording machine, by means of an abrasion resistance tester such as the Taber Abraser. In this instrument a 4-inch disc of the coated sheet is firmly held on a flat hard-rubber-surfaced turntable and rotated beneath two 2" x ½" abrasive wheels revolving about axles parallel to the sheet and with their edge surfaces pressed against the coated surface. The wheels abrade a path in the coating which is 3½ inches outside diameter. The number of revolutions of the disc required for the abrasive wheels to wear through the coating is taken as a measure of the abrasion resistance. In the test here described, abrasive wheels consisting of abrasive particles in a rubbery binder and designated by the manufacturer as "Calibrase CS-10" wheels were used under a load of 1000 grams each. The test was run at room temperature. The thickness of magnetic coating was at least about 0.6 mil and not more than 1.0 mil, and results are given in revolutions per mil of thickness.

It was found that coated magnetic recording media having the conventional type of nitrocellulose-base binders failed in the abrasion test at 100–150 revolutions per mil. On the other hand, the coated sheet material of this invention, having equivalent proportional amounts of similar magnetic particles but employing the novel vinyl polymer - butadiene - acrylonitrile polymer binder here described, as more specifically set forth in the examples, provided an abrasion resistance value of at least about 300–500 revolutions per mil, and in some cases as high as 800 revolutions per mil.

We have also observed that binders having a "Taber abrasion value" as hereinabove defined of less than about 250–300 revolutions per mil show a decided loss of active material on extended use of the magnetic recording tape, whereas above this value no detectable wear is observed under the same conditions.

The invention has hereinabove been described in terms of specific embodiments. While certain equivalent materials and structures as herein noted are also contemplated, it is nonetheless true that the invention is quite specific in the type of binder employed and in the relationship of the binder to the other components of the tape product.

With regard to polymers of vinyl chloride and vinyl acetate as employed in the specific examples, we have found that these polymers must have a vinyl chloride content of at least about 86% and not more than about 91%, must be soluble in methyl isobutyl ketone, and must have a molecular weight of at least about 10,000, in order to achieve proper balance of abrasion resistance, heat resistance, toughness, flexibility, and coating properties. The remainder of the polymer (to make 100%) may be copolymerized vinyl acetate, or a mixture of vinyl acetate and vinyl alcohol, or a mixture of vinyl acetate and some other copolymerizable monomer. Mixtures of polymers may be used to advantage in many cases; for example, one-half of the vinyl chloride-vinyl acetate copolymer of Example 1 may be replaced by an equal weight of a copolymer of 91 parts vinyl chloride, 3 parts vinyl acetate and 6 parts vinyl alcohol. Other equivalent high molecular weight ketone-soluble vinyl polymers may replace the vinyl chloride-vinyl acetate copolymer in whole or in part.

The butadiene-acrylonitrile polymer must be compatible with the vinyl polymer and provide the required degree of softness and flexibility while still maintaining a high degree of abrasion resistance. Combinations of butadiene and acrylonitrile providing rubbery polymers which are soluble in methyl isobutyl ketone are found in general to fulfill these requirements. Such combinations range from about 75 to about 55 parts of butadiene and correspondingly about 25–45 parts of acrylonitrile.

The ratio between the two polymers likewise is important, although depending to a considerable degree on the type and amount of magnetic oxide pigment added. The proportions employed in the examples represent the approximate compositional limits of the specific binders there given, where iron oxide pigment represents about ⅔ of the total weight of binder and pigment. As high as four parts of magnetic iron oxide have in some cases been used with one part of binder to produce coatings which are still adequately abrasion-resistant, but it is preferred to hold the proportions of oxide and binder between about 2:1 and about 3:1. Where much more than this proportion of oxide is added, the binder is insufficient to hold the pigment in place; with less oxide, magnetic efficiency is reduced.

While other prime-coats may be employed to provide a suitable bond between magnetic layer and backing layer, the particular mixture described has given excellent results and is preferred. Similarly, while thin paper as in Example 3, or other fibrous backings, or various low-stretch non-fibrous films, or films containing reinforcing fibers may be substituted for the cellulose acetate film of Examples 1 and 2, that particular film in conjunction with the specific primer coating as described provides an entirely satisfactory base for our novel magnetic coating and is preferred by us.

There has thus been described a new product, particularly in the form of magnetic recording tape or sheet, comprising a thin, flexible backing and a firmly adherently attached permanently flexible and non-cracking magnetic coating.

As previously noted, the magnetic coating desirably contains approximately two parts of magnetic iron oxide particles uniformly dispersed in and bonded with approximately one part of a flexible and abrasion-resistant binder comprising a high molecular weight, ketone-soluble vinyl polymer and a rubbery, ketone-soluble butadiene-acrylonitrile polymer. Within these compositional limitations, particularly desirable results are obtained where the binder consists predominantly of about 60–80 parts of a ketone-soluble vinyl chloride polymer and correspondingly about 40–20 parts of a copolymer of about 75–55 parts of butadiene and about 25–45 parts of acrylonitrile, and wherein the ketone-soluble vinyl chloride polymer represents a vinyl chloride content of at least about 86%.

With this particular class of binder compositions, there is obtained a surprising combination of properties not heretofore available. In terms of the properties to be obtained with the coated product in tape form, the material does not block (become tacky) at moderately elevated temperatures nor crack or flake (become brittle) at low temperatures. Tests made on the coated surface of the sheet show the material to have the surprisingly high Taber abrasion resistance value as herein identified of at least about 300 revolutions per mil.

What we claim is:

1. As a new product, a magnetic recording medium in sheet or tape form, non-blocking at moderately elevated temperatures and non-cracking at low temperatures, comprising a thin flexible non-magnetic backing and a firmly adherently attached magnetic coating, said coating being a uniform dispersion of about two parts of magnetic iron oxide pigment in one part of a binder, and said binder comprising a blend of about 60–80 parts of a methyl isobutyl ketone-soluble copolymer of monomers comprising vinyl chloride and vinyl acetate, the amount of vinyl chloride being about 86–91 percent of the total monomers, and correspondingly about 40–20 parts of a copolymer of about 55–75 parts of butadiene and about 45–25 parts of acrylonitrile, the Taber abrasion resistance value of the said product as herein identified being at least about 300 revolutions per mil.

2. As a new product, a magnetic recording tape, non-blocking at moderately elevated temperatures and non-cracking at low temperatures, comprising a thin flexible non-magnetic non-fibrous film backing and a firmly adherently attached magnetic coating, said coating being a uniform dispersion of about two parts of magnetic iron oxide pigment in one part of a binder, and said binder consisting of a blend of about 60–80 parts of a copolymer of about 86–91 parts of vinyl chloride and about 14–9 parts of vinyl acetate and correspondingly about 40–20 parts of a copolymer of about 55–75 parts of butadiene and about 45–25 parts of acrylonitrile, the Taber abrasion resistance value of the said product as herein identified being at least about 300 revolutions per mil.

3. As a new product, a magnetic recording tape, non-blocking at moderately elevated temperatures and non-cracking at low temperatures, comprising a thin flexible non-magnetic cellulose acetate film and a magnetic coating firmly adherently bonded thereto by a prime-coating of a blend of a rubbery butadiene-acrylonitrile polymer and a compatible spirit-soluble heat-reactive phenol-aldehyde resin, said magnetic coating being a uniform dispersion of about two parts of blocky magnetic iron oxide pigment in one part of a binder, and said binder consisting of a blend of about 80 parts of a copolymer of about 90 parts of vinyl chloride and about 10 parts of vinyl acetate and correspondingly about 20 parts of a copolymer of about 65 parts of butadiene and about 35 parts of acrylonitrile, the Taber abrasion resistance value of the said product as herein identified being at least about 300 revolutions per mil.

AMBROSE F. SCHMELZLE.
ESTHER E. EASTWOLD.

REFERENCES CITED

The following references are of record in the file of this patent:

UNITED STATES PATENTS

| Number | Name | Date |
|---|---|---|
| 2,330,353 | Henderson | Sept. 28, 1943 |
| 2,385,319 | Eustis et al. | Sept. 18, 1945 |
| 2,405,038 | Jennings | July 30, 1946 |
| 2,418,479 | Pratt et al. | Apr. 8, 1947 |
| 2,525,601 | Howell | Oct. 10, 1950 |

FOREIGN PATENTS

| Number | Country | Date |
|---|---|---|
| 466,023 | Great Britain | May 18, 1937 |